(12) United States Patent  
Hauer

(10) Patent No.: US 12,135,210 B1
(45) Date of Patent: Nov. 5, 2024

(54) SKATE BLADE FLATNESS GAGE

(71) Applicant: Michael William Hauer, Brooklyn, MI (US)

(72) Inventor: Michael William Hauer, Brooklyn, MI (US)

(73) Assignee: Michael William haver, Brooklyn, MI (US)

( * ) Notice: Subject to any disclaimer, the term of this patent is extended or adjusted under 35 U.S.C. 154(b) by 693 days.

(21) Appl. No.: 17/387,989

(22) Filed: Jul. 28, 2021

Related U.S. Application Data

(63) Continuation-in-part of application No. 16/371,024, filed on Mar. 31, 2019, now abandoned.

(51) Int. Cl.
G01B 5/28 (2006.01)
A63C 3/00 (2006.01)
G01B 5/00 (2006.01)

(52) U.S. Cl.
CPC ............... *G01B 5/285* (2013.01); *A63C 3/00* (2013.01); *G01B 5/0023* (2013.01)

(58) Field of Classification Search
CPC ........ G01B 5/0023; G01B 5/285; G01B 5/30; G01B 3/30; G01B 5/24; G01B 3/34; G01B 3/42; G01B 5/25; A63C 3/12; A63C 3/00; A63C 17/002
See application file for complete search history.

(56) References Cited

U.S. PATENT DOCUMENTS

| 2,147,933 | A | * | 2/1939 | Smoker | A63C 3/12 280/825 |
| 2,155,472 | A | * | 4/1939 | Colbert | A63C 3/12 280/825 |
| 2,181,779 | A | * | 11/1939 | Barnard | A63C 3/12 292/241 |
| 5,189,845 | A | * | 3/1993 | Courchesne | A63C 3/10 76/83 |

FOREIGN PATENT DOCUMENTS

DE 202010016147 U1 * 5/2011 ............... A63C 3/00

* cited by examiner

*Primary Examiner* — Daniel J Colilla

(57) ABSTRACT

A system for quickly determining if a hockey skate blade is bent is disclosed. The system is a quick and effective way to determine if a Hockey Skate Blade is bent which will affect the ability for the blade to be sharpened and skating performance. The disclosed system is a simple way to quickly ensure skating performance and blade sharpness are optimized.

6 Claims, 1 Drawing Sheet

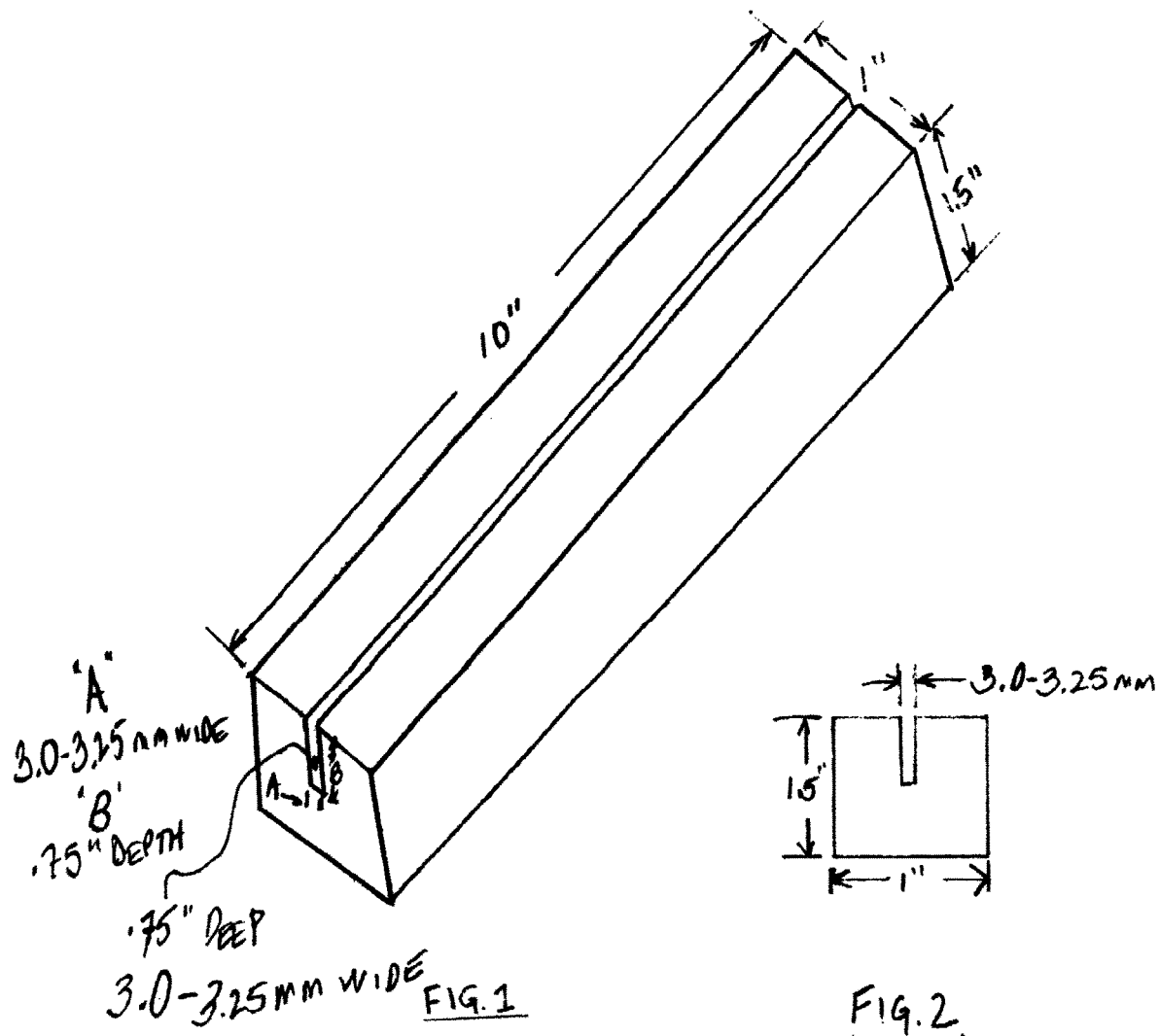

SKATE BLADE FLATNESS GAGE

CROSS-REFERENCE TO RELATED APPLICATIONS

This application is a continuation-in-part of nonprovisional U.S. patent application Ser. No. 16/371,024, filed on Mar. 31, 2019, which is hereby incorporated by reference in its entirety.

FIELD OF INVENTION

The technology relates to the general field of the sport of hockey, and has certain specific application to hockey, figure and goalie skate blades.

BACKGROUND

Hockey skate blades originally were thicker and had a metal holder for support of the blade. The technology evolved and they went to a plastic holder and a thinner blade made from hard carbon steel. The next stage was a plastic holder and a blade made from stainless steel. The carbon steel blades had a tendency to break while stainless steel has a tendency to bend when impacted. Current gages to determine if a skate blade is bent are multi-piece assemblies that are expensive. They will have a read out or they are combined with another function (sharpening, honing, blade holding for blade mounting, remove nicks or marrs). Usage with one hand, quickly, by the person with the skate on their foot is needed while participating in the sport or during a game.

SUMMARY

The disclosed Skate Blade Flatness Gage will check a Skate Blade to see if it is bent, potentially broken or has large burrs. Bent, broken or burrs on skate blades will impede skating performance and the ability of the blade to be sharpened effectively.

It may be used by hockey skate sharpening professionals, personal skate blade sharpeners, hockey equipment managers, coaches, hockey players, figure skaters and anyone that skates recreationally.

BRIEF DESCRIPTION OF THE DRAWINGS

Various embodiments of the invention are disclosed in the following detailed description and accompanying drawings.

FIG. 1 illustrates an isometric view of the Skate Blade Flatness Gage, for a 2.9 mm blade and a 3.25 mm slot.

FIG. 2 illustrates a front view of the Skate Blade Flatness Gage. for a 2.9 mm blade and a 3.25 mm slot.

DETAILED DESCRIPTION OF THE INVENTION

A current hockey skate blade is made from multiple grades of steel and is 2.9 mm thick. Figure skates are typically thicker and goalie skates are typically 4.0 mm thick.

The Skate Blade Flatness Gage is a go/no go gage where by the skate blade is either pressed into the slot from the top with the blade parallel to the slot or inserted to the slot from the front to the back or back to the front. If any resistance is felt inserting or removing the blade into the slot from any direction, then the blade is bent.

It is made of a material that with has very low moisture absorption and a low coefficient of thermal expansion. The slot in the gage is 0.1" to 10" deep and is made to the thickness of the skate blade plus a tolerance for the amount you want the maximum delta from flatness of the blade. i.e. a 2.9 mm blade could have a 3.0 mm gap or up to 3.5 mm. The block can be (1" to 20" long)×0.1" to 5" high×0.1" to 5" wide. This product is made from Nylon for cost effectiveness and heat stability. The prototype Gage is made at a length of 10" with a 1.5" height and 1" width to fit a majority of hockey skate blade lengths and be cost effective. It can be made of multiple lengths, widths and heights to cover specific blade lengths if necessary.

The depth of the slot can be of any depth to ensure the whole depth of the skate blade goes into the slot. The blade holder needs to bottom out in the slot to ensure the whole blade is checked for flatness.

The block is inserted on to the skate blade in multiple ways.

The invention claimed is:

1. A method of checking the flatness of a skate blade comprising the steps of:
   providing a skate having a skate blade;
   providing a skate blade flatness gage comprising:
   a block of non-wood material with a slot along a length of the block,
   wherein the slot is configured to have the same thickness as the skate blade plus a certain acceptable tolerance of variation from the thickness of the skate blade,
   wherein the slot is 0.1" to 10" deep;
   wherein the block does not include any measurement indicia;
   holding the skate in one hand of a user;
   holding the skate blade flatness gage in another hand of the user;
   sliding the skate blade into the slot horizontally or at an angle,
   wherein the skate blade flatness gage is configured to prevent one or more of the following from entering the slot:
   a skate blade bent at an angle beyond a certain threshold; and
   a skate blade with burrs larger than a second certain threshold.

2. The method of checking the flatness of a skate blade according to claim 1, wherein said block of non-wood material is configured to not mar, scratch or dull surfaces of the skate blade.

3. The method of checking the flatness of a skate blade according to claim 1, wherein the block of non-wood material has a low coefficient of thermal expansion and low water absorption.

4. The method of checking the flatness of a skate blade according to claim 1, wherein the step of sliding the skate blade into the slot horizontally or at an angle, is performed while the user is wearing the skate on a foot.

5. The method of checking the flatness of a skate blade according to claim 1, wherein the slot is configured to provide resistance above a certain threshold to movement of the skate blade through the slot thereby determining that the blades bent, broken, or has burrs.

6. The method of checking the flatness of a skate blade according to claim 1, wherein the skate blade is configured to be inserted into the slot when the skate blade is installed in a skate boot blade holder or when the skate blade is not installed in a skate boot blade holder.

* * * * *